(12) United States Patent
Albert et al.

(10) Patent No.: US 8,727,307 B2
(45) Date of Patent: May 20, 2014

(54) VALVE WITH OUTLET DUCT

(75) Inventors: Laurent Albert, Vallangoujard (FR);
Antoine Dutot, Notre Dame de
Bondeville (FR); Nicolas Renard,
Carrières Sous Poissy (FR)

(73) Assignee: Valeo Systemes de Controle Moteur,
Cergy Pontoise Cedex (FR)

( * ) Notice: Subject to any disclaimer, the term of this patent is extended or adjusted under 35 U.S.C. 154(b) by 1390 days.

(21) Appl. No.: 12/090,338

(22) PCT Filed: Oct. 19, 2006

(86) PCT No.: PCT/FR2006/002346
§ 371 (c)(1),
(2), (4) Date: Apr. 15, 2008

(87) PCT Pub. No.: WO2007/048901
PCT Pub. Date: May 3, 2007

(65) Prior Publication Data
US 2008/0237523 A1    Oct. 2, 2008

(30) Foreign Application Priority Data
Oct. 28, 2005   (FR) .................................... 05 11109

(51) Int. Cl.
*F16K 47/00*    (2006.01)
(52) U.S. Cl.
USPC ........................................................ 251/122
(58) Field of Classification Search
USPC .................. 251/118, 120, 121, 122
See application file for complete search history.

(56) References Cited

U.S. PATENT DOCUMENTS

| | | | |
|---|---|---|---|
| 1,401,468 A * | 12/1921 | Fitts ................................... | 137/1 |
| 1,529,926 A | 3/1925 | Scheelk | |
| 1,970,726 A * | 8/1934 | Barrett .......................... | 251/122 |
| 2,114,858 A * | 4/1938 | Rosch ........................... | 251/122 |
| 3,308,852 A * | 3/1967 | Parker et al. ..................... | 138/46 |
| 4,607,822 A * | 8/1986 | Schabert et al. ............... | 251/334 |
| 6,494,229 B2 * | 12/2002 | Kajitani ......................... | 137/530 |
| 2002/0033462 A1 | 3/2002 | Kajitani | |

FOREIGN PATENT DOCUMENTS

WO         02/36999 A2    5/2002

OTHER PUBLICATIONS

International Search Report for PCT/FR2006/002346 mailed Mar. 12, 2007 with translation (4 pages).

* cited by examiner

*Primary Examiner* — John K Fristoe, Jr.
(74) *Attorney, Agent, or Firm* — Osha Liang LLP

(57) ABSTRACT

A valve has a first duct and a second duct at right angles to the first duct. The first duct opens into a connecting portion of the second duct, defining an intersection that forms a seat for a valve disk that slides in the connecting portion in a direction at right angles to the seat between a closed position and an open position. The connecting portion has two flat walls facing one another and connected by an end wall. The first duct opens onto one of the flat walls. The end wall partially surrounds the valve disk parallel to the a direction of sliding at a distance from an edge of the valve disk that is such that, for the open position, the end wall defines with the edge of the valve disk and the seat a passage.

11 Claims, 2 Drawing Sheets

VALVE WITH OUTLET DUCT

The present invention relates to a valve for regulating a flow that can be used, for example, in an exhaust gas recirculation (or EGR, to give it its English-language acronym) circuit of a combustion engine of a motor vehicle (a car, a truck, a public transport or utility vehicle, etc.).

BACKGROUND OF THE INVENTION

A valve such as this comprises a first duct, which admits exhaust gases into the valve, and a second duct which lets the gases out of the valve. The first duct is at right angles to the second duct and opens into a connecting portion where the second duct is connected to the first duct thereby defining an intersection that forms a seat for a valve disk that slides in the connecting portion of the second duct in a direction at right angles to the seat between a closed position in which the valve disk is pressed against the seat and a wide open position in which the valve disk is away from the seat. The valve disk is set in motion by means of an actuator moving it between its closed position and its open position in order to regulate the separation (or lift) of the valve disk with respect to its seat and thus regulate the passage cross section for the exhaust gases, the wide open position allowing a maximum flow rate of exhaust gases through the valve.

Anti-pollution standards are now making it necessary to recirculate a more substantial proportion of the exhaust gases. It has therefore been envisioned for the flow rate of exhaust gases through the valves to be increased by increasing the lift of the valve disk and/or the diameters of the valve disk and of its seat. However, solutions such as these present problems of mechanical robustness and lead to an increase in the amount of space required for the valve, this in particular being incompatible with, on the one hand, the amount of space available under the hood of vehicles which is becoming increasingly restricted and, on the other hand, the overall lightening of vehicles that vehicle manufacturers are aiming for in order to limit the fuel consumption of their vehicles.

Now, it has become apparent that turbulence in the exhaust gases appears in the vicinity of the wall of the connecting portion and disrupts the flow of the exhaust gases through the passage cross section delimited by the valve disk and its seat. These disturbances limit the maximum flow rate of exhaust gases through the valve.

SUBJECT OF THE INVENTION

It is an object of the invention to provide a valve that allows a high flow rate while at the same time having a relatively compact structure.

BRIEF DESCRIPTION OF THE INVENTION

To this end, there is provided a valve comprising a first duct and a second duct lying at right angles to the first duct, the first duct opening into a connecting portion of the second duct thereby defining an intersection that forms a seat for a valve disk that slides in the connecting portion in a direction at right angles to the seat between a closed position and an open position, the connecting portion comprising two flat walls facing one another and connected by an end wall, the first duct opening onto one of the flat walls and the end wall partially surrounding the valve disk parallel to the direction of sliding at a distance from an edge of the valve disk that is such that, for the open position, the end wall defines with the edge of the valve disk and the seat a passage, the cross section of which increases from a median axis of the end wall toward regions where the end wall meets the second duct.

The end wall surrounding the valve disk improves the flow of gases toward the second duct. The cross section defined in the invention between the valve disk, the seat and the end wall makes it easier for the gases to flow over the entire perimeter of the valve disk and, in particular, in the central portion of the end wall opposite the outlet of the second duct and limits the risk of turbulence appearing between the valve disk its seat.

Advantageously, the end wall is designed in such a way that, for any angular sector defined between the median axis of the end wall and any arbitrary point on the end wall, the passage cross section locally defined between the end wall, the edge of the valve disk and the seat in the vicinity of this point is at least equal to the product of a coefficient and an effective passage cross section locally defined in line with the seat between the edge of the valve disk and the seat in the angular sector concerned.

This arrangement allows better flow of the exhaust gases around the valve disk and prevents the formation of an obstruction in the central portion of the end wall.

Other features and advantages of the invention will become apparent from reading the description which follows of one nonlimiting particular embodiment of the invention.

BRIEF DESCRIPTION OF THE DRAWINGS

Reference will be made to the attached drawings among which.

DETAILED DESCRIPTION OF THE INVENTION

Figure 1:
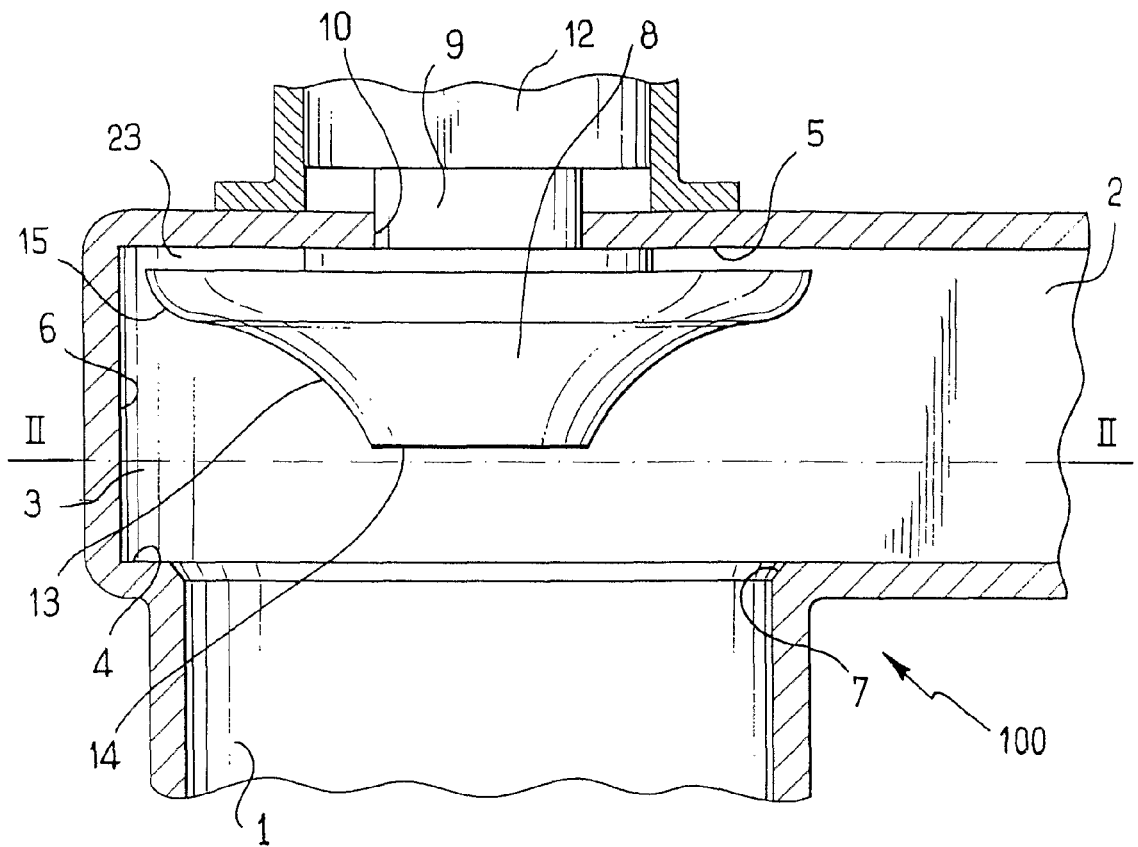
FIG. 1 is a schematic view of the valve according to the invention in longitudinal section on I-I of FIG. 2.
Figure 2:
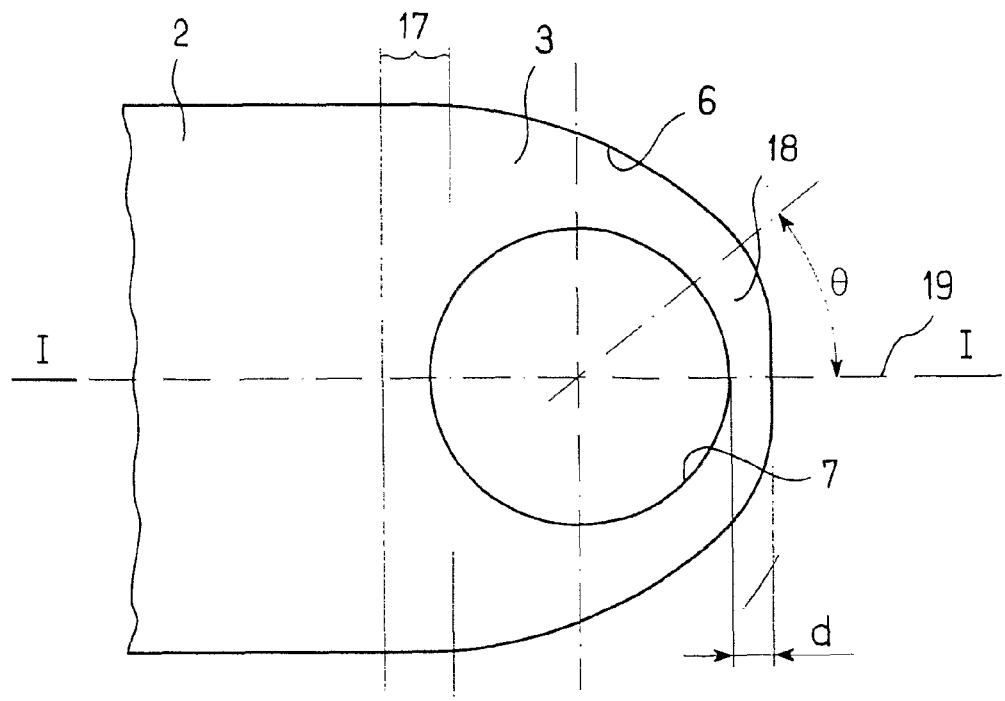
FIG. 2 is a schematic view of the valve showing, from below in section on II-II of FIG. 1, the internal contour of the second duct and the contour of the seat.

With reference to the figures, the valve denoted overall as 100 comprises a first duct 1 intended to be connected to a gas inlet pipe and a second duct 2 which runs at right angles to the duct 1 and is intended to be connected to a gas discharge pipe.

The duct 2 has a connecting portion 3 where it connects to the duct 1. The connecting portion 3 comprises two flat walls 4, 5 facing one another and connected by an end wall 6. The duct 1 opens into the connecting portion 3 via the flat wall 4 thereby defining an intersection that forms a seat 7 for a valve disk 8. The valve disk 8 is secured to an actuating stem 9 slideably housed in a bore 10 formed in the flat wall 5. The bore 10 runs facing the seat 7 at right angles thereto and opens into the connecting portion 3. The actuating stem 9 is connected to an actuator 12 fixed to the outside of the duct 2.

The valve disk 8 has, facing the seat 7, a deviation surface 13 formed of a surface of revolution with a curved generatrix in this instance in the shape of an arc of a circle. The deviation surface 13 thus has a curvilinear profile with a narrow base 14 facing toward the seat 7 and widening away from the seat 7 as far as a peripheral edge 15 of the valve disk 8. At the peripheral edge 15, the generatrix runs tangential to a plane perpendicular to the direction of sliding in order to merge with this plane. The base 14 is formed by the flat end of the actuating stem 9 at the opposite end to the actuator 12 which passes through the valve disk 8 and is welded thereto at the base 14. The valve disk 8 has, on the opposite side to the seat 7, a flat rear face 16 projecting from the center of which there extends a boss 11.

The end wall 6 of the connecting portion 3 partially surrounds the valve disk 8 parallel to the direction in which the valve disk 8 slides and meets the remainder of the duct 2 in a connecting region 17. The end wall 6 is separated from the peripheral edge 15 by a distance, the purpose of which is explained in relation to the way in which the valve operates which is given in the remainder of the description.

Figure 3:
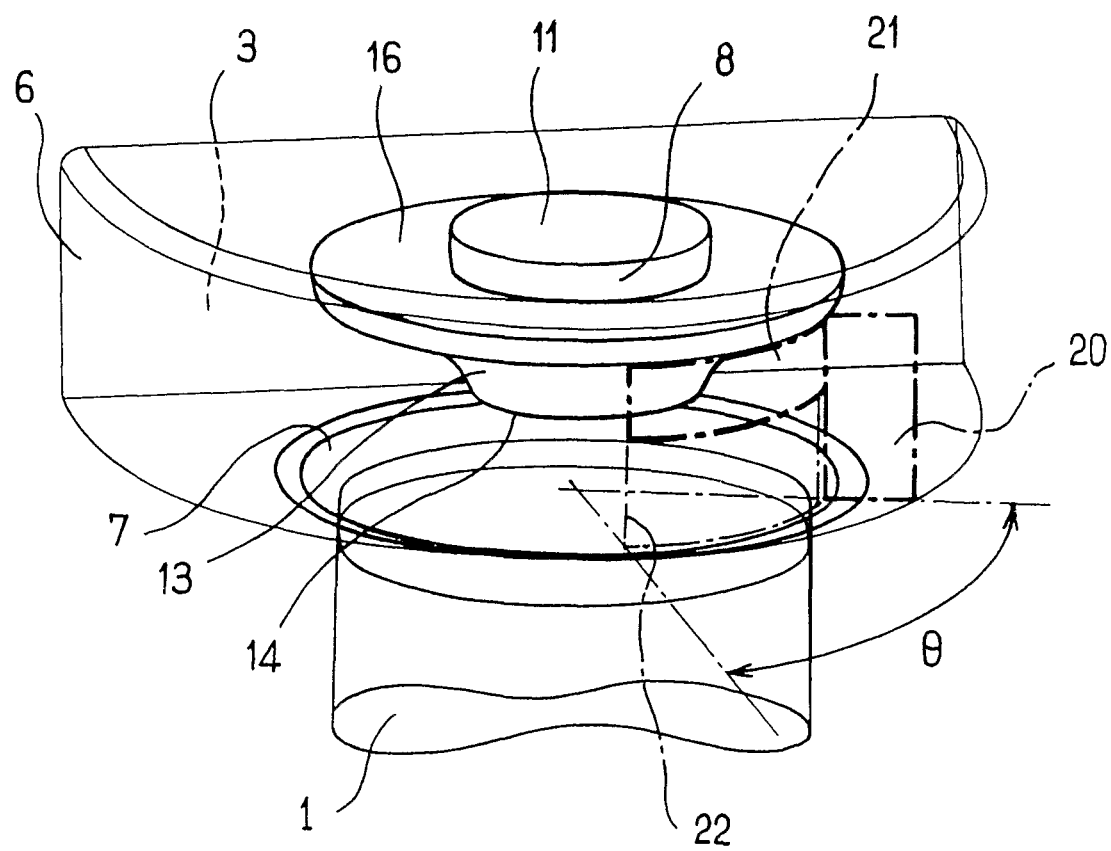
FIG. 3 is a perspective view showing, as hidden detail, the internal contours of the valve.

The actuator 12 thus controls the sliding of the valve disk 8 in a direction at right angles to the seat 7 between a fully closed position in which the valve disk 8 is pressed against the seat 7 and an open position (depicted in FIG. 1) or position of maximum lift of the valve disk 8, in which position the valve disk 8 is separated from the seat 7 and the peripheral edge 15 defines with the seat 7 in line therewith a theoretical maximum passage cross section for the gases (this being depicted in fine chain line in FIG. 3 and referenced 22).

In the wide open position, the actuator 12 is controlled in such a way that the valve disk 8 lies in close proximity to the wall 5. This makes it possible to prevent any gases from flowing behind the valve disk 8 and giving rise to turbulence that would disrupt the flow of the gases upstream of the valve disk. More specifically, in the wide open position, the boss 11 of the valve disk 8 bears against the wall 5 in such a way that a narrow space 23 is left between the wall 5 and the valve disk 8. As the boss 11 rests against the wall 5, the valve disk 8 closes off the bore 10 and prevents any particles and dirt carried by the gases from entering the bore 10 and adversely affecting the ease with which the stem 9 slides. The space 23 left between the valve disk 8 and the wall 5 makes it possible to avoid any suction effect that might counter the return of the valve disk 8 from its wide open position to its fully closed position. The fact that the valve disk 8 bears against the wall 5 over a small surface area limits the stresses that bearing over a large surface area could introduce into the connection between the stem 9 and the valve disk 8 if the stem 9 and the valve disk 8 were not exactly perpendicular or if the wall 5 or the rear face 16 were to exhibit flatness defects.

The purpose of the deviation surface 13 is to deflect at right angles to the duct 1 a gaseous stream originating therefrom. The guidance of the gaseous stream by the deviation surface limits the onset of turbulence in the gaseous stream as this stream travels from the first duct to the second duct and improves the flow rate through the valve. The shape of the deviation surface 13 as a surface of revolution with a curved generatrix makes the valve disk easier to produce. Having the generatrix shaped as an arc of a circle combines simplicity of production with effectiveness.

The end wall 6 of the connecting portion 3 is separated from the peripheral edge 15 by a distance such that, for the wide open position, the end wall 6 defines with the peripheral edge 15 of the valve disk B and the seat 7 a passage 18, the cross section of which increases from a median axis 19 of the end wall 6 toward the connecting region 17. More specifically, the end wall 6 is designed in such a way that, for any angular sector θ defined between the median axis 19 and any arbitrary point on the end wall 6, the passage cross section 20 locally defined between the end wall 6, the peripheral edge 15 and the seat 7 in the vicinity of this point is at least equal to an effective passage cross section 21 locally defined in line with the seat 7 between the peripheral edge 15 and the seat 7 in the angular sector concerned. The effective passage cross section 21 is equal to approximately half the theoretical maximum passage cross section 22 locally defined in the angular sector concerned.

The passage cross section 20 is at least equal to the effective passage cross section 21 modified by a coefficient k greater than 1 and dependent on the angular sector θ concerned.

In this instance, the coefficient k is equal to π divided by the angle θ in radians (π/θ). Thus, for θ=π/4, the cross section 20 is equal to four times the cross section 21. For θ angle values close to zero, the end wall 6 is straight and separated from the valve disk 8 by a distance d at the median axis 19 such that the cross section 20 is greater than the cross section 21 even for small values of θ. The θ-dependent coefficient makes it possible to take into consideration the local flow rate of exhaust gases which increases as θ increases.

Of course, the invention is not restricted to the embodiment described but encompasses any alternative forms of embodiment that fall within the scope of the invention as defined by the claims.

The stop means for arresting the valve disk in the open position may be formed of a boss projecting from the flat wall 5.

In general, the cross section 20 may be equal to k times the cross section 21 with 1≤k≤π/θ for θ varying between 0 and 2π/3 approximately on either side of the median axis 19.

The combination of the shape of the second duct, the deviation surface of the valve disk and the way it is positioned in the open position are an optimum solution for maximizing the flow rate through the valve. Each of these features may, however, be used independently of the others in order to achieve the invention and a combination of just two of these features is usable.

The invention claimed is:

1. A valve comprising;
   a first duct; and
   a second duct lying at right angles to the first duct,
   wherein the first duct opens into a connecting portion of the second duct thereby defining an intersection that forms a seat for a valve disk that slides in the connecting portion in a direction at right angles to the seat between a closed position and an open position,
   wherein the connecting portion comprises two flat walls facing one another and connected by an end wall,
   wherein the first duct opens onto one of the two flat walls,
   wherein the end wall partially surrounds the valve disk parallel to a direction of sliding at a distance from an edge of the valve disk such that, for the open position, the end wall defines with the edge of the valve disk and the seat a passage, the cross section of which increases from a median axis of the end wall toward regions where the end wall meets the second duct, and
   wherein a narrow space is left between one of the two flat walls facing the seat and the valve disk in the open postion.

2. The valve as claimed in claim 1, in which the end wall is designed in such a way that, for any angular sector defined between the median axis of the end wall and any arbitrary point on the end wall, the passage cross section locally defined between the end wall, the edge of the valve disk and the seat in the vicinity of this point is at least equal to the product of a coefficient and an effective passage cross section locally defined in line with the seat between the edge of the valve disk and the seat in the angular sector concerned.

3. The valve as claimed in claim 2, in which the effective passage cross section locally defined in line with the seat between the edge of the valve disk and the seat is equal to approximately half the theoretical maximum passage cross section locally defined in the angular sector concerned in line with the seat between the edge of the valve disk and the seat.

4. The valve as claimed in claim 2, in which the coefficient is dependent on the angle of the angular sector concerned.

5. The valve as claimed in claim 2, in which the coefficient ranges between 1 and $\pi$ divided by the angle, in radians, of the angular sector concerned.

6. The valve as claimed in claim 1, comprising means of operating the valve disk between its two positions which are controlled in such a way as to bring the valve disk into close proximity to the flat wall of the connecting portion lying facing the seat.

7. The valve as claimed in claim 6, comprising stop means for arresting the valve disk in the open position in order to maintain the space between the flat wall facing the seat and the valve disk.

8. The valve as claimed in claim 7, in which the valve disk is secured to an actuating stem housed in a bore formed in the flat wall of the second duct facing the seat, and the valve disk, in the open position, closes off the bore.

9. The valve as claimed in claim 1, in which the valve disk has, facing the seat, a deviation surface of curvilinear profile having a narrow base facing toward the seat and widening away from the seat in order to deflect at right angles to the first duct a gaseous stream originating therefrom.

10. The valve as claimed in claim 9, in which the deviation surface is a surface of revolution with a curved generatrix.

11. The valve as claimed in claim 10, in which the generatrix has a shape of an arc of a circle.

* * * * *